(12) United States Patent
Huang

(10) Patent No.: US 11,799,395 B2
(45) Date of Patent: Oct. 24, 2023

(54) ACTUATOR

(71) Applicant: ASUSTEK COMPUTER INC., Taipei (TW)

(72) Inventor: Lai-Shi Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 241 days.

(21) Appl. No.: 17/017,265

(22) Filed: Sep. 10, 2020

(65) Prior Publication Data

US 2021/0099103 A1  Apr. 1, 2021

(30) Foreign Application Priority Data

Sep. 27, 2019 (TW) .................................. 108135251

(51) Int. Cl.
*H02N 1/00* (2006.01)
*H04R 19/01* (2006.01)

(52) U.S. Cl.
CPC ............. *H02N 1/006* (2013.01); *H02N 1/00* (2013.01); *H04R 19/01* (2013.01)

(58) Field of Classification Search
CPC .......... H02N 1/00; H02N 1/004; H02N 1/006; H04R 19/01; H04R 7/10; H04R 19/02; H03K 2217/960755; H03K 17/975; H01H 2239/006

See application file for complete search history.

(56) References Cited

U.S. PATENT DOCUMENTS

| | | | | |
|---|---|---|---|---|
| 3,742,152 A * | 6/1973 | Lewiner | ................. | G01H 11/06 381/116 |
| 4,016,375 A * | 4/1977 | Van Turnhout | ........ | H01G 7/023 381/191 |
| 5,235,225 A * | 8/1993 | Colgate | .................. | H02N 1/004 310/22 |
| 8,081,784 B2 * | 12/2011 | Liou | ..................... | H04R 19/013 340/384.73 |
| 8,776,367 B2 * | 7/2014 | Lee | ........................ | H04R 31/00 29/886 |
| 9,178,446 B2 * | 11/2015 | Wang | ........................ | H02N 1/04 |
| 11,575,991 B2 * | 2/2023 | Badger | .................... | H04R 19/02 |
| 2011/0109200 A1 * | 5/2011 | Jenninger | .............. | H01L 41/083 29/25.35 |
| 2011/0216923 A1 * | 9/2011 | Chiang | ................... | H04R 19/01 381/186 |

FOREIGN PATENT DOCUMENTS

| | | | |
|---|---|---|---|
| CN | 201150129 Y | 11/2008 | |
| CN | 102395092 B | 6/2014 | |
| CN | 108231993 A | 6/2018 | |
| EP | 2159857 A1 * | 3/2010 | ........... H01L 41/083 |
| TW | M430769 U | 6/2012 | |
| WO | WO-9956498 A1 | 11/1999 | |

* cited by examiner

*Primary Examiner* — Burton S Mullins
(74) *Attorney, Agent, or Firm* — Muncy, Geissler, Olds & Lowe, P.C.

(57) ABSTRACT

An actuator is provided, including a plurality of conducting layers and a plurality of electret layers. The electret layers are respectively sandwiched between the conducting layers, and form gaps between the conducting layers. Directions of preset electric fields of the adjacent electret layers are opposite, and the adjacent conducting layers are respectively electrically connected to a first voltage end and a second voltage end to receive a driving voltage.

3 Claims, 9 Drawing Sheets

ACTUATOR

CROSS-REFERENCE TO RELATED APPLICATION

This application claims the priority benefit of Taiwan application serial No. 108135251, filed on Sep. 27, 2019. The entirety of the above-mentioned patent application is hereby incorporated by reference herein and made a part of the specification.

BACKGROUND OF THE INVENTION

Field of the Invention

The disclosure relates to an actuator, and especially, to an electric actuator.

Description of the Related Art

An actuator is a device that converts energy into mechanical kinetic energy, and is configured to drive an object to perform various predefined actions. Based on energy sources, actuators are classified into electric actuators, optical actuators, thermal actuators, and fluid-energy actuators.

Conventionally, electric actuator technology includes electromagnetic types, piezoelectric types, or electrostatic types and are all facing limitations on sizes and costs due to a complex structure, further fails to provide a sufficient actuation stroke due to a limitation of physical properties of the materials.

BRIEF SUMMARY OF THE INVENTION

The disclosure provides an actuator. The actuator includes a plurality of conducting layers and a plurality of electret layers. The electret layers are respectively sandwiched between the conducting layers, and form gaps between the conducting layers. Directions of preset electric fields of the adjacent electret layers are opposite, and the adjacent conducting layers are respectively electrically connected to a first voltage end and a second voltage end to receive a driving voltage.

The actuator provided in the disclosure conducts the electret layers and the conducting layers with advantages of simple design, low element costs. This decreases manufacture costs and facilitates to form different sizes for requirements. In addition, the actuator provides a sufficient action distance under a limited size, to meet requirements.

DETAILED DESCRIPTION OF THE EMBODIMENTS

Specific embodiments of the disclosure are further described below with reference to the schematic drawings. According to the following descriptions and claims, the advantages and features of the disclosure become clearer. It should be noted that the accompanying drawings, which are in simplified forms and not drawn to precise scale, are merely used for helping describe the embodiments of the disclosure conveniently and clearly.

Figure 1:
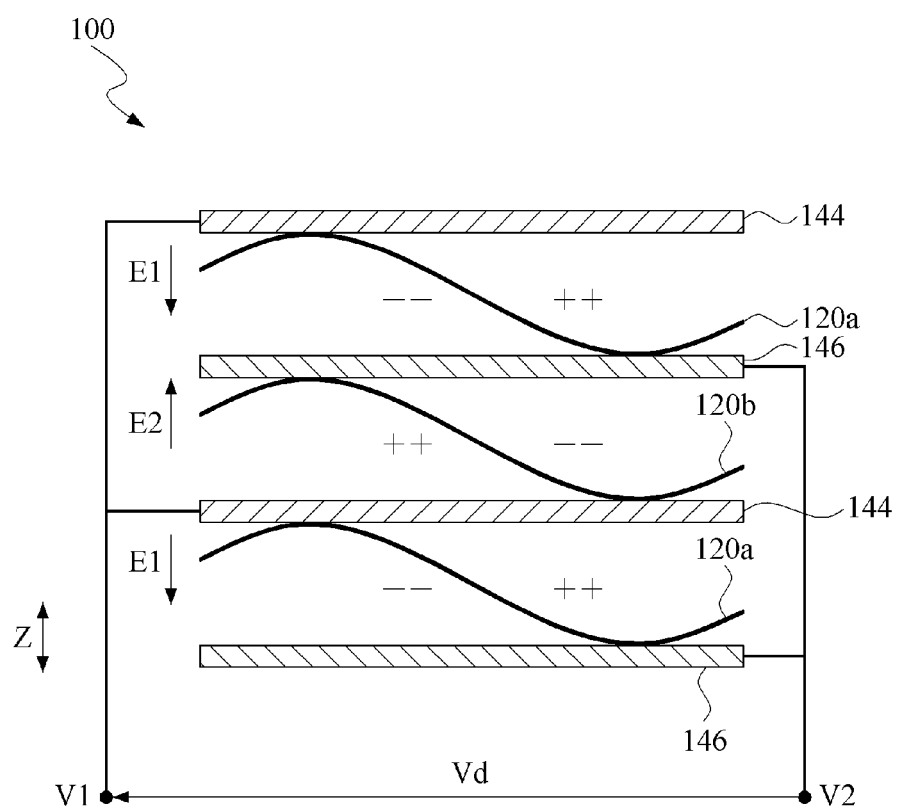
FIG. 1 is a schematic diagram of an embodiment of an actuator according to the disclosure.

FIG. 1 is a schematic diagram of an embodiment of an actuator according to the disclosure. As shown in the figure, the actuator 100 includes a plurality of first conducting layers 144, a plurality of second conducting layers 146, a plurality of first electret layers 120a, and a plurality of second electret layers 120b. The first conducting layers 144 and the second conducting layers 146 are plate structures. The electret layers 120a, 120b are respectively located between the conducting layers 144, 146. The electret layers 120a, 120b are stacked with the conducting layers 144, 146 alternately to form a multilayer structure.

However, in the multilayer structure, the electret layers 120a, 120b are not closely stacked between the conducting layers 144, 146. As shown in the figure, shapes of corresponding surfaces of the electret layers 120a, 120b and the conducting layers 144, 146 are different. Therefore, gaps are generated between the electret layer 120a, 120b and the conducting layers 144, 146.

The following descriptions are provided by using the first electret layer 120a as an example. A shape of an upper surface of the first electret layer 120a is different from a shape of a lower surface of the first conducting layer 144 located above the first electret layer 120a. The upper surface of the first electret layer 120a abuts against the first conducting layer 144, thus generating a gap between the first electret layer 120a and the first conducting layer 144.

Similarly, a shape of a lower surface of the first electret layer 120a is different from a shape of an upper surface of the second conducting layer 146 located beneath the first electret layer 120a. The lower surface of the first electret layer 120a abuts against the second conducting layer 146, thus generating a gap between the first electret layer 120a and the second conducting layer 146. The structure of the second electret layer 120b is similar.

In addition, in the multilayer structure, each electret layer 120a, 120b includes a preset electric field E1, E2, and directions of the preset electric fields E1, E2 are approximately parallel to an actuating direction Z of the actuator 100. Moreover, directions of the preset electric fields E1, E2 of the adjacent electret layers are opposite to each other. As shown in the figure, the direction of the preset electric field E1 of the first electret layer 120a is downward, and the direction of the preset electric field E2 of the second electret layer 120b is upward. In an embodiment, the electret layer 120a, 120b is made of a deformable material, and the component materials include materials with a high dielectric constant, such as polytetrafluoroethylene. When an external electric field is maintained, polytetrafluoroethylene is applied into a layer, thus forming the electret layer 120a, 120b.

In addition, in the multilayer structure, the adjacent conducting layers (that is, the first conducting layer 144 and the second conducting layer 146) are respectively electrically connected to a first voltage end V1 and a second voltage end V2 to receive a driving voltage Vd.

In this embodiment, as shown in FIG. 1, the electret layers 120a, 120b are wavy, and the conducting layers 144, 146 are plate-shaped. Gaps are generated between the electret layer 120a, 120b and the conducting layers 144, 146. However, the disclosure is not limited thereto.

Figure 2:
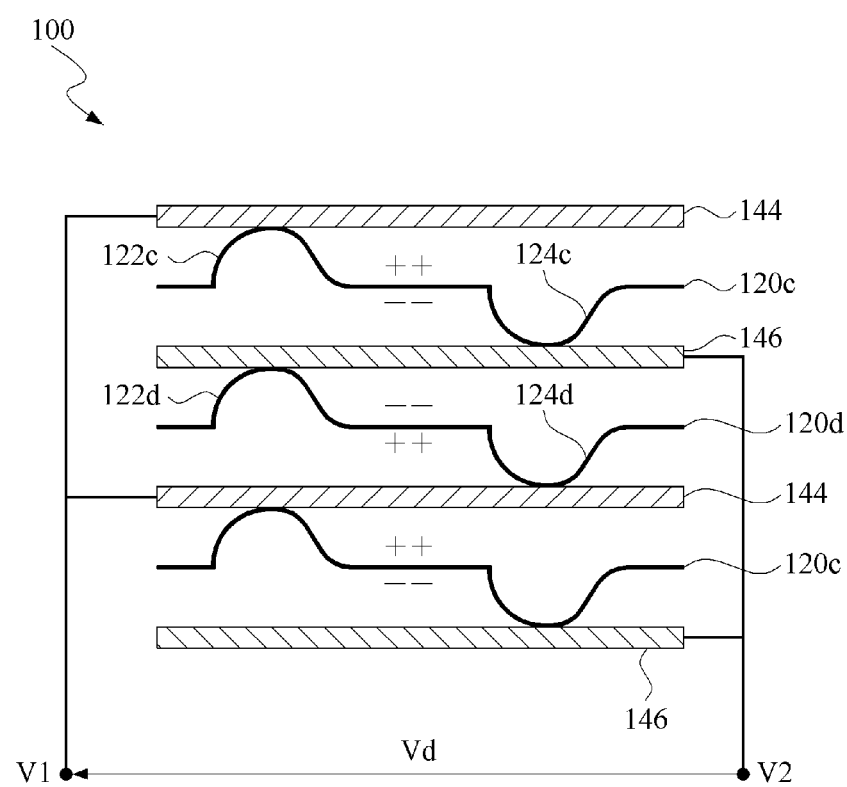
FIG. 2 is a schematic diagram of an embodiment of an actuator according to the disclosure.

In an embodiment, as shown in FIG. 2, the electret layers 120a, 120b and the conducting layers 144, 146 are plate-shaped. An electret layer 120c includes two protruding portions 122c, 124c respectively abutting against the conducting layers 144, 146 that are located above and below the electret layer 120c. An electret layer 120d also includes two protruding portions 122d, 124d respectively abutting against the conducting layers 144, 146 that are located above and below the electret layer 120d. Thus gaps exist between the electret layers 120c, 120d and the conducting layers 144, 146.

In addition, in this embodiment, upper and lower surfaces of each electret layer 120a, 120b respectively abut against the conducting layers 144, 146, to generate gaps between the electret layer 120a, 120b and the conducting layers 144, 146. However, the disclosure is not limited thereto. In an embodiment, additional insulation meshes, for example, breathable materials such as silk, nonwoven fabric, fabric, paper, and perforated film, are inserted between each electret layer 120a, 120b and the conducting layers 144, 146, to facilitate transmitting actions of the electret layer 120a, 120b to the conducting layers 144, 146.

In this embodiment, a preset electric field E1, E2 is built in advance inside each electret layer 120a, 120b. However, the disclosure is not limited thereto. In an embodiment, alternatively, the electret layers 120a, 120b are electrically connected to a power to receive a direct current bias, to maintain the preset electric fields E1, E2. The direct current bias is discontinuously or continuously applied to the electret layers 120a, 120b, to maintain charges on the electret layers 120a, 120b.

Figure 3A:
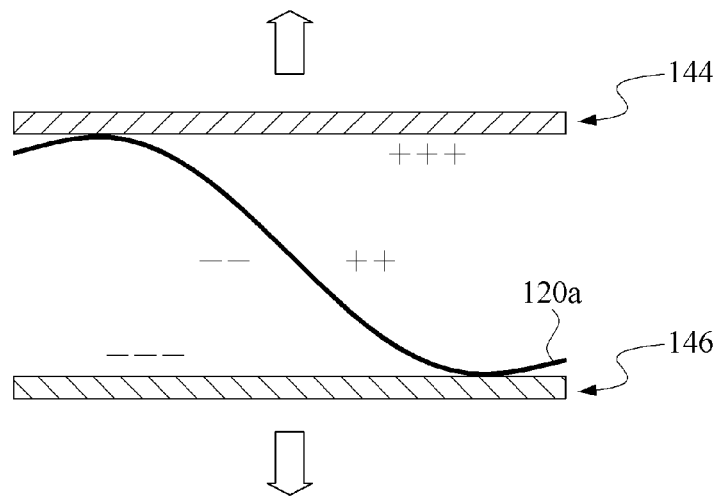
FIG. 3A and FIG. 3B are schematic diagrams of operations of the actuator in FIG. 1.
Figure 3B:
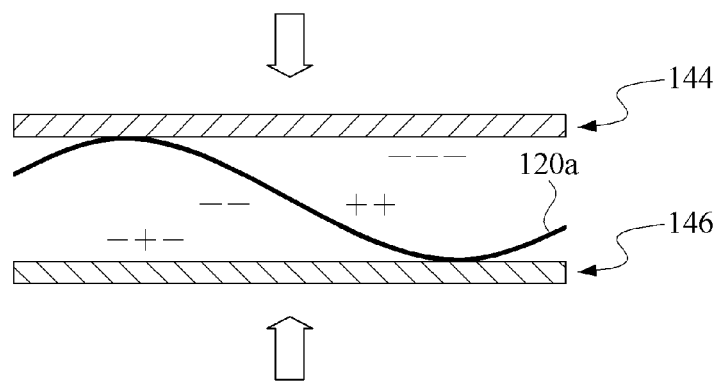

FIG. 3A and FIG. 3B are schematic diagrams of operations of the actuator 100 in FIG. 1. The following provides descriptions by using the first electret layer 120 as an example. An operation principle of the second electret layer 120b is similar to that of the first electret layer 120a, and details are not described herein again.

For the first electret layer 120a, the direction of the preset electric field E1 is downward. That is, positive charges are distributed on the upper surface of the first electret layer 120a, and negative charges are distributed on the lower surface. As shown in FIG. 3A, when a positive voltage is applied between the first voltage end V1 and the second voltage end V2, positive charges are distributed on a first conducting layer 144 located above the first electret layer 120a, and negative charges are distributed on a second conducting layer 146 located beneath the first electret layer 120a.

In this case, because the electrical property of the first conducting layer 144 (including positive charges) is same as the electrical property of the upper surface (including positive charges) of the first electret layer 120a, a repulsive force is generated between the first conducting layer 144 and the first electret layer 120a located beneath the first conducting layer 144.

Similarly, because the electrical property of the second conducting layer 146 (including negative charges) is same as the electrical property of the lower surface (including negative charges) of the first electret layer 120a, a repulsive force is also generated between the second conducting layer 146 and the first electret layer 120a located above the conducting layer 146. In this way, the first electret layer 120a is deformed, leading to an increase in the whole length of the actuator 100.

As shown in FIG. 3B, when a negative voltage is applied between the first voltage end V1 and the second voltage end V2, negative charges are distributed on the first conducting layer 144, and positive charges are distributed on the second conducting layer 146. In this case, because the electrical property of the first conducting layer 144 (including negative charges) is opposite to the electrical property of the upper surface (including positive charges) of the first electret layer 120a, an attractive force is generated between the first conducting layer 144 and the first electret layer 120a located beneath the first conducting layer 144.

Similarly, because the electrical property of the second conducting layer 146 (including positive charges) is opposite to the electrical property of the lower surface (including negative charges) of the first electret layer 120a, an attractive force is also generated between the second conducting layer 146 and the first electret layer 120a located above the conducting layer 146. In this way, the first electret layer 120a is deformed, leading to a decrease in the whole length of the actuator 100.

Because the actuator 100 in the disclosure is formed by stacking a plurality of electret layers 120a, 120b and a plurality of conducting layers 144, 146 alternately, in spite of the limited deformation generated by one single group of the electret layer 120a and the conducting layers 144, 146, the deformation of the entire actuator 100 is increased after multiple layers are stacked. In addition, an action distance of the actuator 100 is determined by adjusting the number of stacked layers of the electret layers 120a, 120b and the conducting layers 144, 146, to meet a requirement in an actual application.

Figure 4:
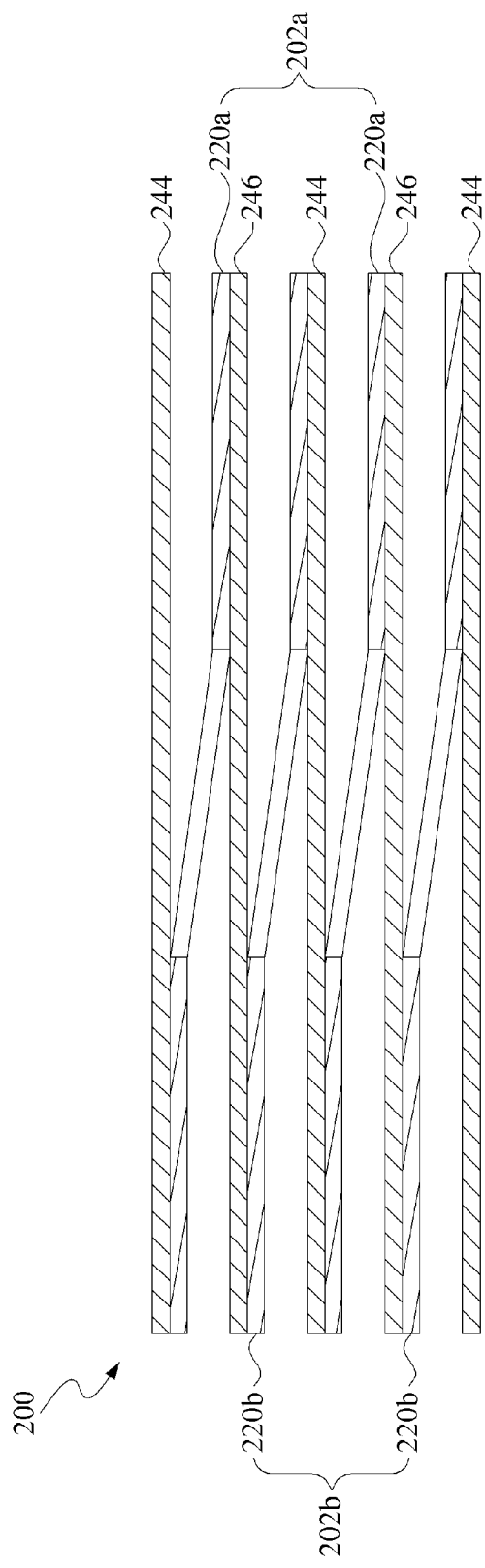
FIG. 4 is a schematic diagram of an embodiment of an actuator according to the disclosure.

FIG. 4 is a schematic diagram of an embodiment of the actuator according to the disclosure. As shown in the figure, the actuator 200 includes a first helical structure 202a, a second helical structure 202b, a plurality of first conducting layers 244, and a plurality of second conducting layers 246. The first helical structure 202a and the second helical structure 202b wind with each other in a staggered manner.

The first helical structure 202a is regarded as being formed by connecting a plurality of first electret layers 220a. The second helical structure 202b is regarded as being formed by connecting a plurality of second electret layers 220b. The first conducting layers 244 and the second conducting layers 246 are sandwiched between the first helical structure 202a and the second helical structure 202b alternately, to form a multilayer structure.

The first conducting layers 244 are electrically connected to a first voltage end V1, and the second conducting layers 246 are electrically connected to a second voltage end V2. An action distance of the actuator 200 is determined by changing the number of turns of the first helical structure 202a and the second helical structure 202b, and the number of layers of the conducting layers 244, 246, to meet a requirement in an actual application.

Figure 5:
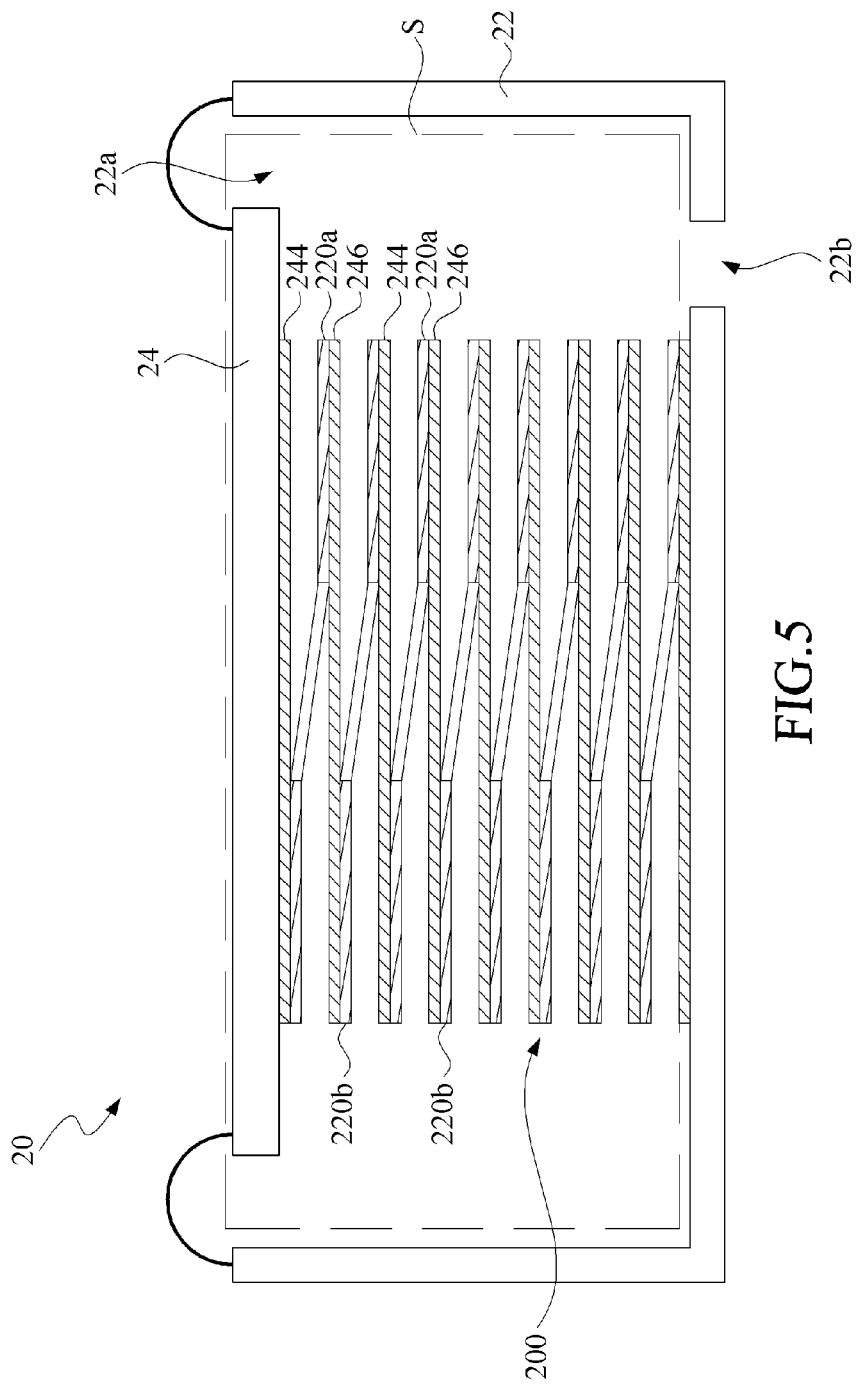
FIG. 5 is a schematic diagram of an embodiment of the actuator in FIG. 4 applied to a speaker.

FIG. 5 is a schematic diagram of an embodiment of an actuator applied to a speaker. In this embodiment, the actuator 200 in FIG. 4 is applied to a speaker. As shown in the figure, the speaker 20 includes a fixing box 22, a vibration plate 24. The fixing box 22 includes a space S therein, and an opening 22a is provided above the space S.

The fixing box 22 further includes at least one hole 22b (in the figure, one hole 22b is used as an example). The actuator 200 is disposed inside the space S, and the vibration plate 24 is hanged at the opening 22a. One end (that is, the lower end in the figure) of the actuator 200 is fixed at the bottom of the fixing box 22, and the other end (that is, the upper end in the figure) is fixed on the vibration plate 24.

Referring to FIG. 4 together, the action distance of the actuator 200 is adjusted by changing a voltage level of a driving voltage Vd inputted into the first voltage end V1 and the second voltage end V2, thereby driving the vibration plate 24 to vibrate to produce a sound.

Because the actuation effect of the actuator 200 is achieved by changing the charge distribution on the first conducting layers 244 and the second conducting layers 246, the actuator 200 quickly responds to the change in the voltage level of the first voltage end V1 and the second voltage end V2, to comply with the rapid variation of the sound signal and avoid distortion. In addition, because the actuator 200 is disposed by means of stacking, the actuator 200 provides a sufficient action distance, to comply with a requirement of a large-amplitude sound signal.

Figure 6:
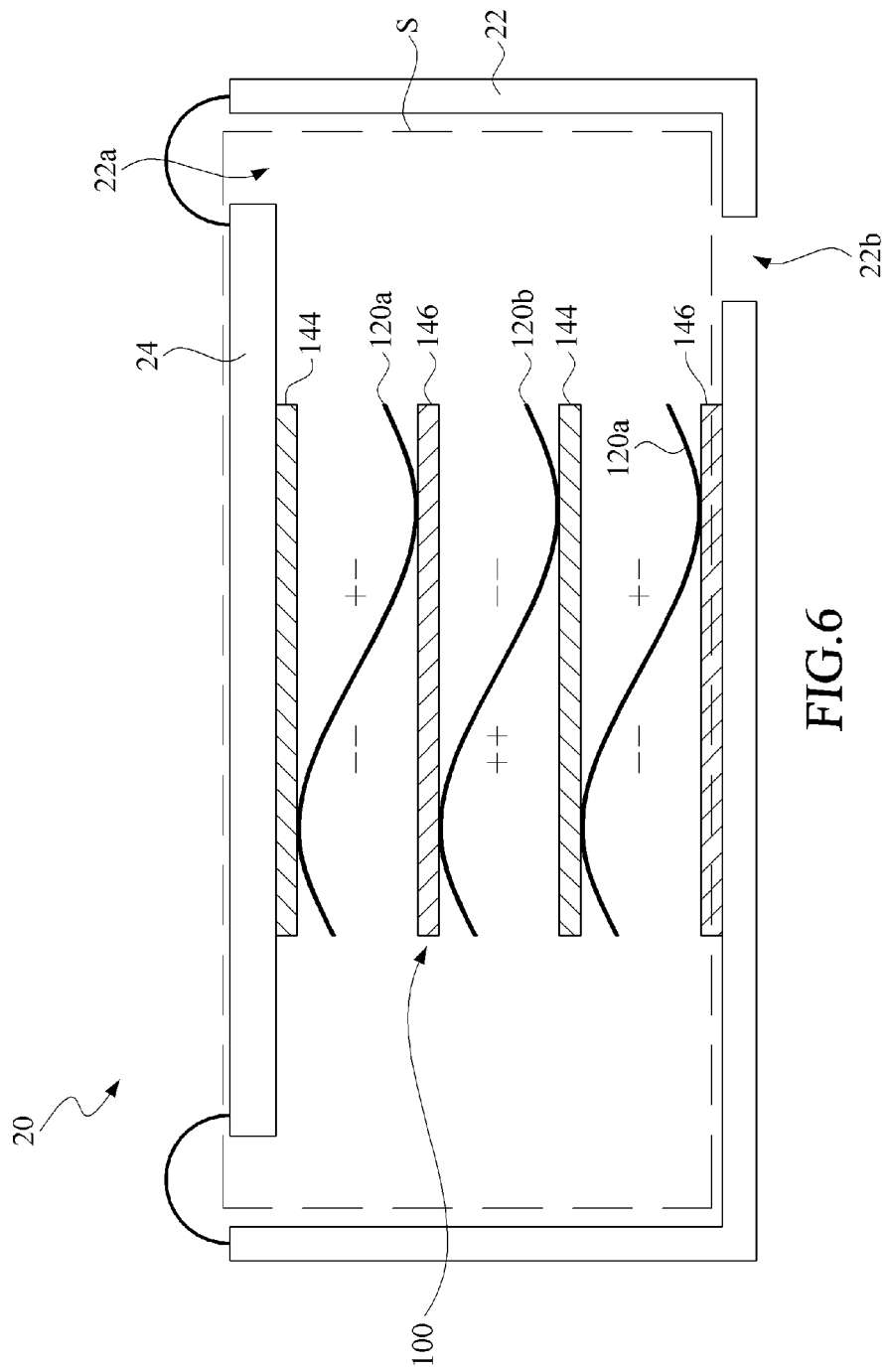
FIG. 6 is a schematic diagram of an embodiment of the actuator in FIG. 1 applied to a speaker.

FIG. 6 is a schematic diagram of an embodiment of an actuator applied to a speaker. In this embodiment, the actuator 100 in FIG. 1 is applied to a speaker. As shown in the figure, the speaker 20 includes a fixing box 22, a vibration plate 24, and the actuator 100 in FIG. 1. The fixing box 22 includes a space S therein, and an opening 22a is provided above the space S. The fixing box 22 further includes at least one hole 22b (in the figure, one hole 22b is used as an example). The actuator 100 is disposed inside the space S, and the vibration plate 24 is hanged at the opening 22a. One end (that is, the lower end in the figure) of the actuator 100 is fixed on the bottom of the fixing box 22, and the other end (that is, the upper end in the figure) is fixed on the vibration plate 24.

Referring to FIG. 1 together, the action distance of the actuator 100 is adjusted by changing a voltage level of a driving voltage Vd inputted into the first voltage end V1 and the second voltage end V2, thereby driving the vibration plate 24 to vibrate to produce a sound.

Because the actuation effect of the actuator 100 is achieved by changing the charge distribution on the first conducting layers 144 and the second conducting layers 146, the actuator 100 quickly responds to the change in the voltage level of the first voltage end V1 and the second voltage end V2, to comply with the rapid variation of the sound signal and avoid distortion. In addition, because the actuator 100 is disposed by means of stacking, the actuator 100 provides a sufficient action distance, to comply with a requirement of a large-amplitude sound signal.

Figure 7:
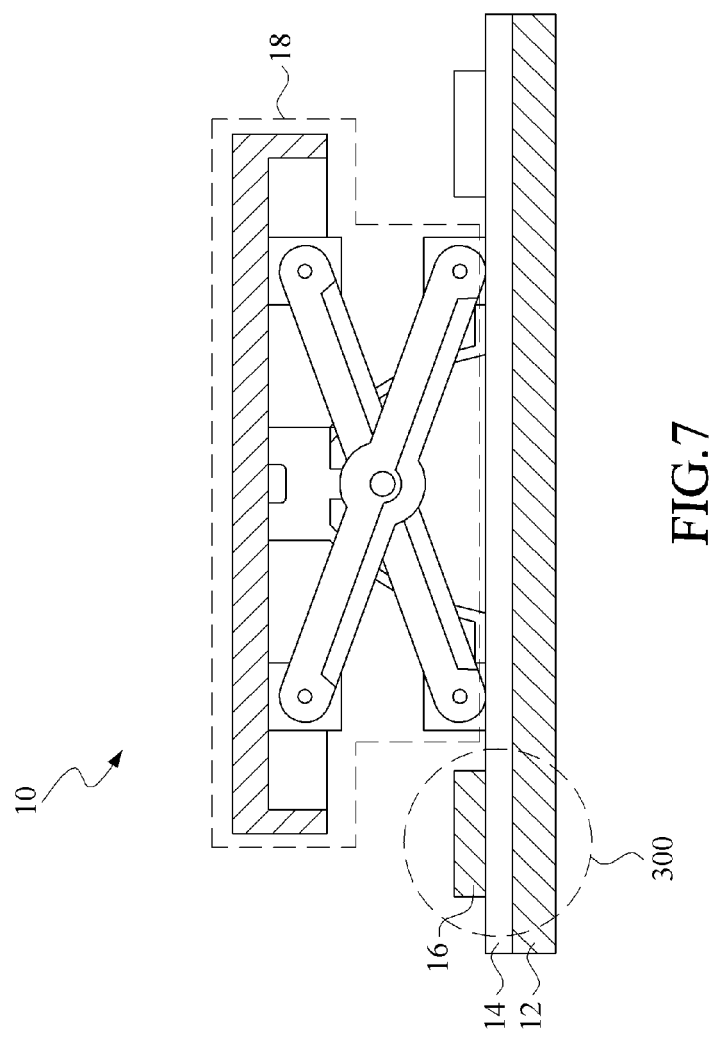
FIG. 7 is a schematic diagram of an embodiment of the actuator in FIG. 1 applied to a keyboard module.

FIG. 7 is a schematic diagram of an embodiment of an actuator applied to a keyboard module according to the disclosure. As shown in the figure, the keyboard module 10 includes a first conducting layer 12, an electret layer 14, a second conducting layer 16, and a key module 18. The electret layer 14 is overlaid on the first conducting layer 12, and the key module 18 is disposed on the electret layer 14. The second conducting layer 16 is disposed in an area, which is on the electret layer 14 and in which the key module 18 is not disposed.

The first conducting layer 12, the electret layer 14, and the second conducting layer 16 form an actuator 300. The actuator 300 is used as a speaker integrated in the keyboard module 10.

Figure 8:
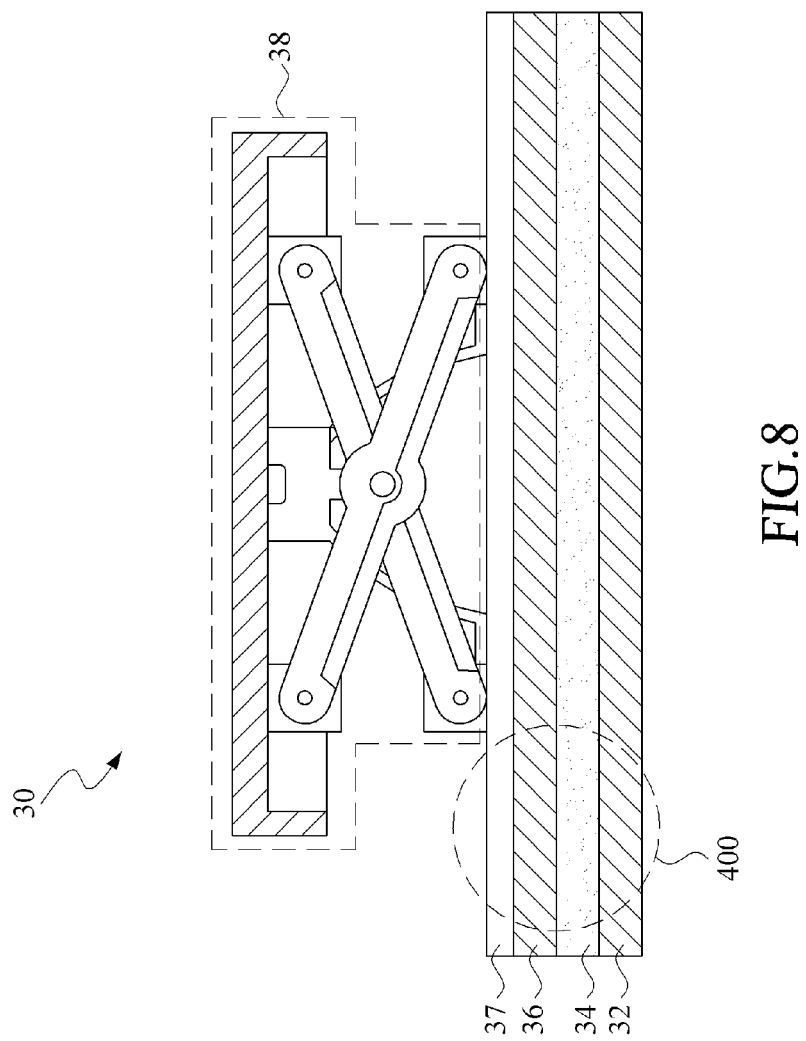
FIG. 8 is a schematic diagram of an embodiment of the actuator in FIG. 1 applied to a keyboard module.

FIG. 8 is a schematic diagram of an embodiment of an actuator applied to a keyboard module according to the disclosure. As shown in the figure, the keyboard module 30 includes a first conducting layer 32, an electret layer 34, a second conducting layer 36, an insulation layer 37, and a key module 38. The electret layer 34 is overlaid on the first conducting layer 32, and the second conducting layer 36 is overlaid on the electret layer 34. The insulation layer 37 covers the second conducting layer 36. The key module 38 is disposed on the insulation layer 37.

The first conducting layer 32, the electret layer 34, and the second conducting layer 36 form an actuator 400. The actuator 400 is used as a speaker integrated in the keyboard module 30. In addition, the actuator 400 in the disclosure is alternatively applied to other mechanisms with limited space, such as a thin screen, a notebook computer, or a handheld device.

Figure 9:
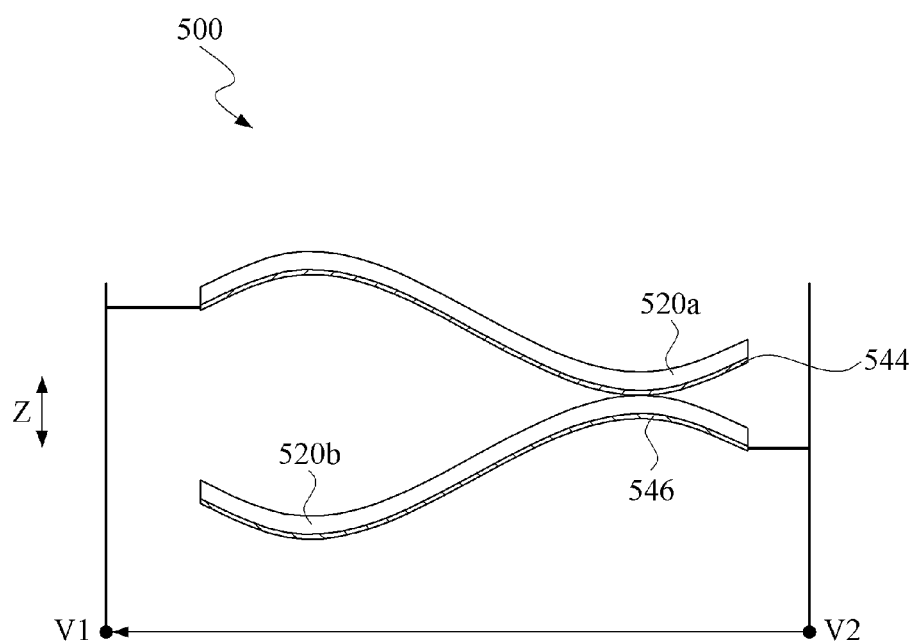
FIG. 9 is a schematic diagram of an embodiment of an actuator according to the disclosure.

FIG. 9 is a schematic diagram of an embodiment of an actuator according to the disclosure. Compared with the embodiment in FIG. 1, an actuator 500 in this embodiment includes a plurality of first conducting layers 544, a plurality of second conducting layers 546, a plurality of first electret layers 520a, and a plurality of second electret layers 520b. The first conducting layer 544 is formed on a lower surface of the first electret layer 520a. The second conducting layer 546 is formed on a lower surface of the second electret layer 520b.

In an embodiment, the first conducting layer 544 and the second conducting layer 546 are respectively formed on the lower surfaces of the first electret layer 520a and the second electret layer 520b by means of sputtering coating. In this way, the electret layers 520a and 520b are respectively located between the conducting layers 544 and 546, to form a multilayer structure.

In conclusion, the actuator 100, 200 provided in the disclosure is mainly made of the electret layers 120a, 120b, 120c, 120d, 220a, 220b and the conducting layers 144, 146, 244, 246. The design is simple and element costs are low. This helps to save manufacture costs and facilitates adjustment to obtain different sizes applicable to different situations. In addition, the actuator provides a sufficient action distance under a limited size, to meet a requirement of a user.

Although the disclosure is disclosed as above by using embodiments, the embodiments are not intended to limit the disclosure. A person skilled in the art makes various variations and improvements without departing from the spirit and scope of the disclosure. Therefore, the protection scope of the disclosure should be subject to the appended claims.

What is claimed is:

1. An actuator, comprising:
   a plurality of conducting layers; and
   a plurality of electret layers, respectively sandwiched between the conducting layers and forming gaps between the conducting layers;
   wherein directions of preset electric fields of the adjacent electret layers are opposite, and the adjacent conducting layers are respectively electrically connected to a first voltage end and a second voltage end to receive a driving voltage,
   wherein each of the plurality of electret layers is a wavy layer,
   wherein each of the plurality of electret layers comprises an upper surface and a lower surface, and the upper surface and the lower surface respectively abut against the adjacent conducting layers directly,
   wherein the plurality of electret layers form a first helical structure and a second helical structure, and directions of preset electric fields of the first helical structure and the second helical structure are opposite.

2. The actuator according to claim 1, wherein each of the plurality of electret layers comprises polyterfluoroethylene.

3. The actuator according to claim 1, wherein each of the plurality of electret layer comprises a protruding portion which configures to abut against each of the conducting layers.

* * * * *